(12) United States Patent
Wang

(10) Patent No.: US 8,929,353 B2
(45) Date of Patent: Jan. 6, 2015

(54) PREAMBLE STRUCTURE AND ACQUISITION FOR A WIRELESS COMMUNICATION SYSTEM

(75) Inventor: Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1182 days.

(21) Appl. No.: 11/746,111

(22) Filed: May 9, 2007

(65) Prior Publication Data
US 2008/0279220 A1    Nov. 13, 2008

(51) Int. Cl.
*H04B 7/212* (2006.01)
*H04W 48/16* (2009.01)
*H04L 27/26* (2006.01)
*H04J 3/02* (2006.01)
*H04L 25/03* (2006.01)
*H04L 5/00* (2006.01)
*H04L 27/00* (2006.01)

(52) U.S. Cl.
CPC ............. *H04W 48/16* (2013.01); *H04L 5/0016* (2013.01); *H04L 27/2613* (2013.01); *H04L 27/2662* (2013.01); *H04J 3/02* (2013.01); *H04L 27/2657* (2013.01); *H04L 25/03866* (2013.01); *H04L 5/0007* (2013.01); *H04L 2027/0034* (2013.01); *H04L 2027/0095* (2013.01); *H04L 27/2605* (2013.01); *H04L 27/2604* (2013.01); *H04L 27/0014* (2013.01); *H04L 5/0048* (2013.01)
USPC ............. 370/347; 370/500; 370/208; 370/338

(58) Field of Classification Search
USPC .......... 370/347, 500, 208, 294, 491; 375/343, 375/141, 260; 455/450
See application file for complete search history.

(56) References Cited

U.S. PATENT DOCUMENTS

| 5,781,543 A | 7/1998 | Ault et al. |
| 6,044,074 A | 3/2000 | Zehavi et al. |

(Continued)

FOREIGN PATENT DOCUMENTS

| CL | 22312004 | 6/2005 |
| CL | 14732005 | 1/2006 |

(Continued)

OTHER PUBLICATIONS

Written Opinion—PCT/US07/071028, International Searching Authority—European Patent Office, Dec. 28, 2007.

(Continued)

*Primary Examiner* — Nathan Taylor
(74) *Attorney, Agent, or Firm* — Peng Zhu

(57) ABSTRACT

Techniques for sending sector/system information in TDM pilots using a hierarchical pilot structure are described. A base station sends multiple sets of bits for the sector/system information in multiple TDM pilots. The set of bits sent in a given TDM pilot may include bits sent in earlier TDM pilots. In one design, the base station generates a first TDM pilot based on a first set of bits, generates a second TDM pilot based on a second set of bits that includes the first set, generates a third TDM pilot based on all bits for the information, and sends the TDM pilots. A terminal performs detection to obtain a first detected value for the first TDM pilot, performs detection based on the first detected value to obtain a second detected value for the second TDM pilot, and performs detection based on the first and second detected values to obtain a third detected value for the third TDM pilot.

22 Claims, 10 Drawing Sheets

(56) References Cited

U.S. PATENT DOCUMENTS

| | | |
|---|---|---|
| 6,097,714 A | 8/2000 | Nagatani et al. |
| 6,137,847 A | 10/2000 | Stott et al. |
| 6,289,007 B1 | 9/2001 | Kim et al. |
| 6,370,134 B1 | 4/2002 | Aramaki |
| 6,414,986 B1 | 7/2002 | Usui |
| 6,430,200 B1 | 8/2002 | Han et al. |
| 6,449,481 B1 | 9/2002 | Kwon et al. |
| 6,483,829 B1 | 11/2002 | Yamamoto |
| 6,556,551 B1 | 4/2003 | Schwartz |
| 6,574,205 B1 | 6/2003 | Sato |
| 6,795,489 B2 | 9/2004 | Joshi et al. |
| 6,888,805 B2 | 5/2005 | Bender et al. |
| 6,929,539 B2 | 8/2005 | Schutz et al. |
| 6,940,827 B2 | 9/2005 | Li et al. |
| 7,051,725 B2 | 5/2006 | Ikemoto et al. |
| 7,120,133 B1 | 10/2006 | Joo et al. |
| 7,197,692 B2 | 3/2007 | Sutivong et al. |
| 7,280,467 B2 | 10/2007 | Smee et al. |
| 7,583,584 B2 | 9/2009 | Wang et al. |
| 7,751,374 B2 | 7/2010 | Donovan |
| 7,756,211 B2 | 7/2010 | Kim et al. |
| 2002/0110138 A1 | 8/2002 | Schramm |
| 2002/0154610 A1 | 10/2002 | Tiedemann, Jr. et al. |
| 2002/0193104 A1 | 12/2002 | Scherzer et al. |
| 2002/0196752 A1 | 12/2002 | Attar et al. |
| 2003/0035405 A1 | 2/2003 | Nagatani et al. |
| 2004/0058081 A1 | 3/2004 | Potyrailo et al. |
| 2004/0233870 A1 | 11/2004 | Willenegger et al. |
| 2005/0018631 A1 | 1/2005 | Sivakumar et al. |
| 2005/0063298 A1* | 3/2005 | Ling et al. ............ 370/208 |
| 2005/0147025 A1 | 7/2005 | Auer |
| 2005/0163262 A1* | 7/2005 | Gupta ............... 375/343 |
| 2005/0201368 A1 | 9/2005 | Periyalwar et al. |
| 2005/0281242 A1 | 12/2005 | Sutivong et al. |
| 2005/0281290 A1 | 12/2005 | Khandekar et al. |
| 2006/0019694 A1 | 1/2006 | Sutivong et al. |
| 2006/0028976 A1 | 2/2006 | Park et al. |
| 2006/0135162 A1 | 6/2006 | Julian et al. |
| 2006/0140313 A1 | 6/2006 | Futami et al. |
| 2006/0183481 A1 | 8/2006 | Furukawa et al. |
| 2006/0209752 A1 | 9/2006 | Wijngaarden et al. |
| 2006/0209927 A1 | 9/2006 | Khandekar et al. |
| 2007/0173276 A1 | 7/2007 | Love et al. |
| 2007/0207812 A1 | 9/2007 | Borran et al. |
| 2007/0287462 A1 | 12/2007 | Gorokhov et al. |
| 2008/0123616 A1 | 5/2008 | Lee |
| 2008/0285526 A1 | 11/2008 | Gorokhov et al. |
| 2014/0092893 A1 | 4/2014 | Wang |

FOREIGN PATENT DOCUMENTS

| | | |
|---|---|---|
| CL | 14742005 | 1/2006 |
| CL | 14762005 | 1/2006 |
| CN | 1348636 A | 5/2002 |
| JP | H09284176 A | 10/1997 |
| JP | 10190625 | 7/1998 |
| JP | H10509287 A | 9/1998 |
| JP | 11088295 A | 3/1999 |
| KR | 20000067168 | 11/2000 |
| RU | 2145152 C1 | 1/2000 |
| RU | 2149509 | 5/2000 |
| RU | 2157592 | 10/2000 |
| RU | 2178239 C2 | 1/2002 |
| RU | 2395170 | 7/2010 |
| TW | 200610292 | 3/2006 |
| WO | 9608908 A2 | 3/1996 |
| WO | 9925079 | 5/1999 |
| WO | WO9925080 | 5/1999 |
| WO | WO0065736 A1 | 11/2000 |
| WO | WO2005022797 | 3/2005 |
| WO | 2005074222 | 8/2005 |
| WO | WO2005107121 A1 | 11/2005 |
| WO | WO2006000091 | 1/2006 |
| WO | WO2006009711 | 1/2006 |
| WO | 2006134829 A1 | 12/2006 |
| WO | 2007137276 | 11/2007 |
| WO | WO2008042889 | 4/2008 |

OTHER PUBLICATIONS

International Preliminary Report on Patentability—PCT/US07/071028, The International Bureau of WIPO—Geneva, Switzerland, Dec. 31, 2008.

International Search Report—PCT/US07/071028, International Search Authority—European Patent Office—Dec. 28, 2007.

ETSI ETS 300 744; "Digital Video Broadcasting (DVB); Framing structure, channel coding and modulation for digital Terrestrial television (DVB-T)" Mar. 1997, pp. 25-34.

Kwang Soon Kim, et al., "A Preamble-Based Cell Searching Technique for OFDM Cellular Systems", Vehicular Technology Conference, 2003, pp. 2471-2475, vol. 4.

Pace, et al., "System Level Performance Evaluation of UTRA-FDD (UMTS Terrestrial Radio Access-Frequency Division Duplex)," 11th IEEE International Symposium on Personal, Indoor and Mobile Radio Communications, PIMRC 2000, Sep. 18-21, 2000, pp. 343-347, vol. 1.

UMTS Terrestrial Radio Access Concept Evaluation ETSI Technical Report, Dec. 1997, pp. 47-48, XP002109765.

Yeh, et al.; "OFDM System Channel Estimation Using Time-Domain Training Sequence for Mobile Reception of Digital Terrestrial Broadcasting," IEEE Transactions on Broadcasting, vol. 46, Issue 3, Sep. 2000 pp. 215-220.

Huawei et al., "CoMP clarification of definitions and TP", R1-083906, 3rd Generation Partnership Project (3GPP), Mobile Competence Centre; 650, Route Des Lucioles; F-06921 Sophia-Antipolis Cedex; France, no. Prague, Czech Republic, Oct. 6, 2008, XP050317217, [retrieved on Oct. 6, 2008].

Higuchi K., et al., "Fast Cell Search Algorithm using Long Code Masking in DS-CDMA Asynchronous Cellular System," Technical Report of the Institute of Electronics, Information and Communication Engineers, Jan. 23, 1997, vol. 96, No. 477, pp. 57-63, RCS 96-122.

Taiwan Search Report—TW096121338—TIPO—Jan. 17, 2012.

Taiwan Search Report—TW096125068—TIPO—Jun. 23, 2011.

Bhushan N., "QUALCOMM Proposal for 3GPP2 Air Interface Evolution Phase 2, Rev.2", 3GPP2 Contribution, Mar. 27, 2006,C30-20060327-023R2.

Tomcik J., "MBFDD and MBTDD Wideband Mode: Technology Overview", IEEE 802.20 Working Group on Mobile Broadband Wireless Access, pp. 1-109, Jan. 6, 2006, IEEE C802.20-05168r1.

Tomcik, J., "QFDD and QTDD: Technology Overview", IEEE 802.20 Working Group on Mobile Broadband Wireless Access, Oct. 28, 2005, pp. 48-50, URL, http://www.ieee802.org/20/contribs/C802.20-05-68.zip.

Tomcik, J.: "QFDD Technology Overview Presentation," IEEE C802.20-05-59r1, pp. 1-74, Internet Citation, [Online] Nov. 15, 2005,XP002422346, Retrieved from the Internet: URL:http://ieee802.org/20/Contribs/C802.20-05-59rl.pdf> [retrieved on Feb. 27, 2007].

* cited by examiner

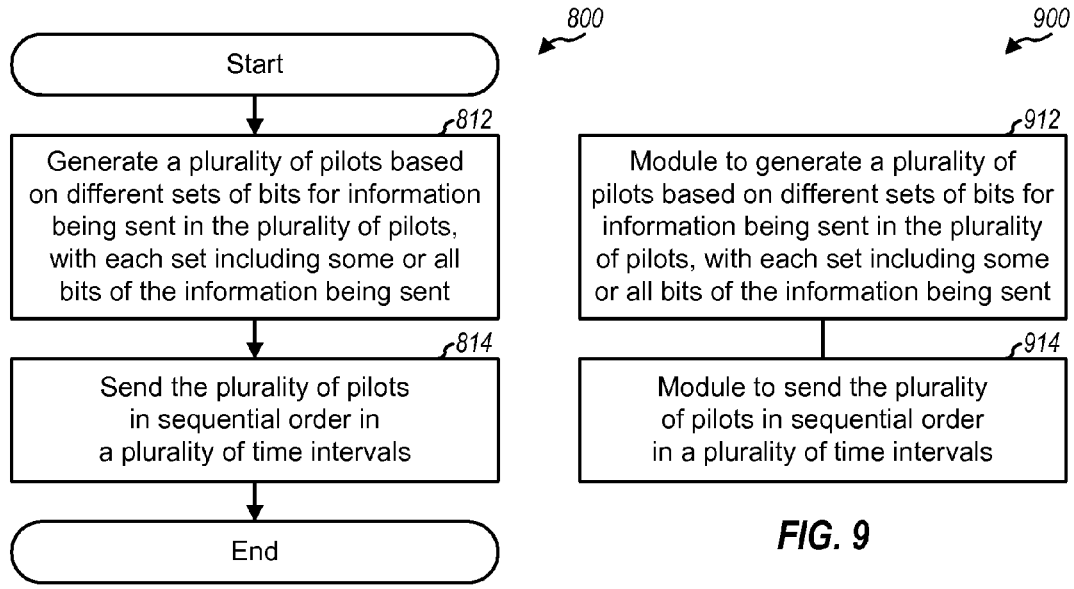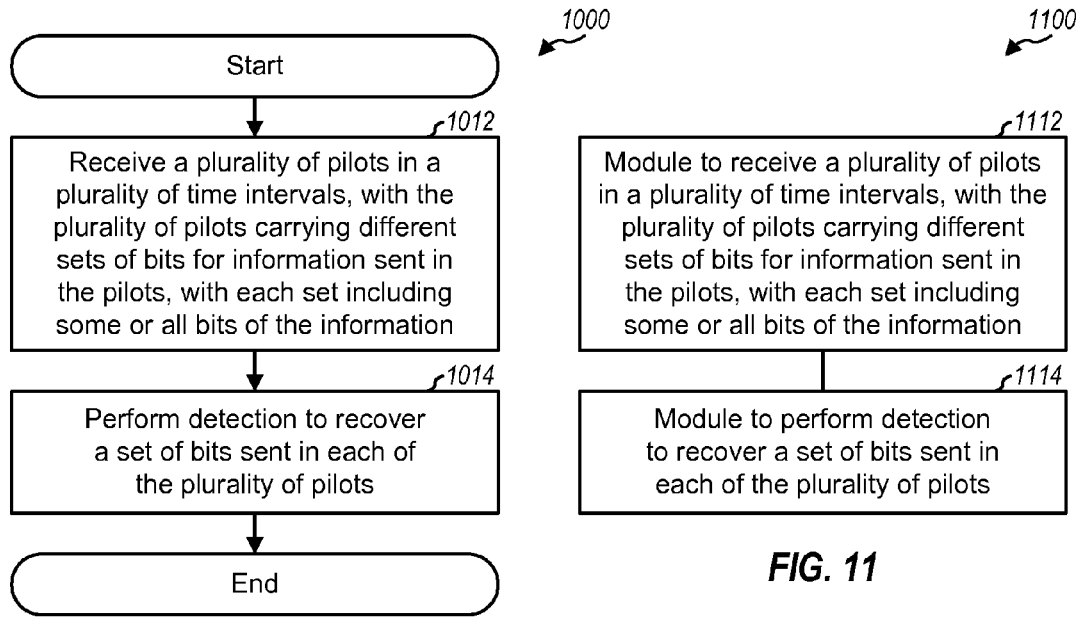

PREAMBLE STRUCTURE AND ACQUISITION FOR A WIRELESS COMMUNICATION SYSTEM

BACKGROUND

I. Field

The present disclosure relates generally to communication, and more specifically to acquisition techniques for a wireless communication system.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include many base stations that support communication for many terminals. A terminal (e.g., a cellular phone) may be within the coverage of zero, one, or multiple base stations at any given moment. The terminal may have just been powered on or may have lost coverage and thus may not know which base stations can be received. The terminal may perform acquisition to detect for base stations and to acquire timing and other information for the detected base stations. The terminal may use the acquired information to access the system via a detected base station.

Each base station may send transmissions to assist the terminals perform acquisition. These transmissions represent overhead and should be sent as efficiently as possible. Furthermore, the transmissions should allow the terminals to perform acquisition as quickly and robustly as possible.

SUMMARY

Techniques for sending sector/system information in time division multiplexed (TDM) pilots by a base station are described herein. Techniques for acquiring the sector/system information from the TDM pilots by a terminal are also described. In one aspect, the sector/system information is sent in the TDM pilots using a hierarchical pilot structure. For the hierarchical pilot structure, multiple sets of bits for the sector/system information may be sent in multiple TDM pilots, and the set of bits sent in a given TDM pilot may include bits sent in one or more earlier TDM pilots. The hierarchical pilot structure may reduce acquisition complexity and improve detection performance for the terminals while allowing a relatively large number of bits to be sent for the sector/system information.

In one design of a 3-level hierarchical pilot structure, a base station may generate a first TDM pilot based on a first set of bits for the sector/system information. The base station may generate a second TDM pilot based on a second set of bits for the sector/system information, with the second set comprising the first set. The base station may generate a third TDM pilot based on all bits of the sector/system information. The base station may send the first, second, and third TDM pilots in first, second, and third time intervals, respectively, in a preamble that is transmitted periodically.

A terminal may perform detection for the first TDM pilot to obtain a first detected value for the first set of bits sent in the first TDM pilot. The terminal may perform detection for the second TDM pilot based on the first detected value to obtain a second detected value for the second set of bits sent in the second TDM pilot. The terminal may perform detection for the third TDM pilot based on the first and second detected values to obtain a third detected value for all bits of the sector/system information sent in the third TDM pilot.

A 2-level hierarchical pilot structure and a non-hierarchical pilot structure are described below. Various aspects and features of the disclosure are also described in further detail below.

BRIEF DESCRIPTION OF THE DRAWINGS

FIG. 8 shows a process performed by the base station to send TDM pilots.
FIG. 9 shows an apparatus for sending TDM pilots.
FIG. 10 shows a process performed by the terminal to receive TDM pilots.
FIG. 11 shows an apparatus for receiving TDM pilots.

DETAILED DESCRIPTION

Figure 1:
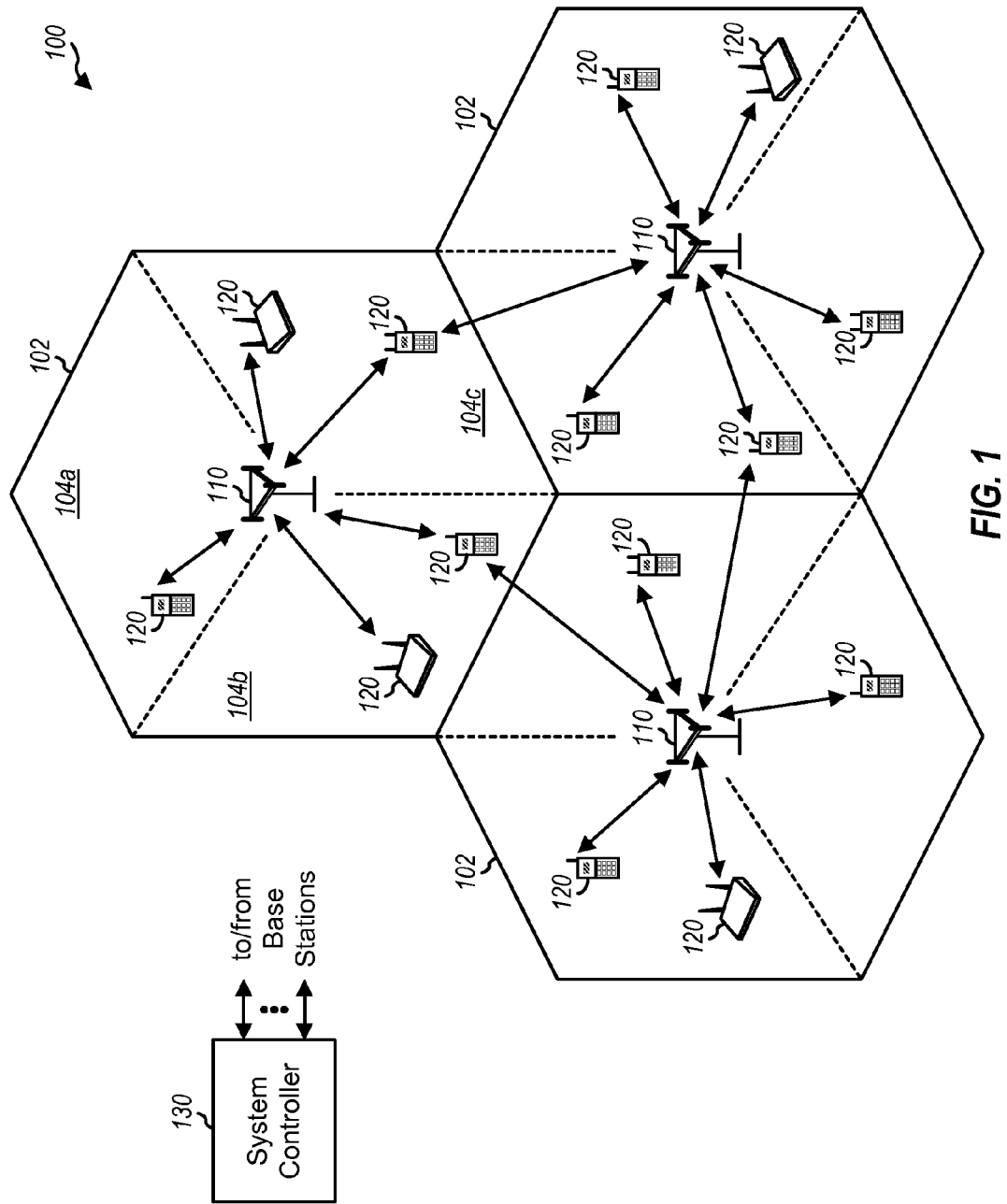
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, an evolved Node B, etc. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base transceiver station (BTS). The term "sector" can refer to a BTS and/or its coverage area depending on the context in which the term is used. For a sectorized cell, the BTSs for all sectors of that cell are typically co-located within the base station for the cell. The techniques described herein may be used for systems with sectorized cells as well as systems with unsectorized cells. For clarity, the techniques are described below for a system with sectorized cells.

Terminals 120 are typically dispersed throughout the system, and each terminal may be stationary or mobile. A terminal may also be called, and may contain some or all of the functionality of, an access terminal, a mobile station, a user equipment, a subscriber unit, a station, etc. A terminal may be a cellular phone, a personal digital assistant (PDA), a wireless device, a wireless modem, a handheld device, a laptop computer, etc. A terminal may communicate with zero, one, or multiple base stations on the forward and/or reverse link at any given moment. The forward link (or downlink) refers to the communication link from the base stations to the terminals, and the reverse link (or uplink) refers to the communication link from the terminals to the base stations.

For a centralized architecture, a system controller 130 couples to base stations 110 and provides coordination and control for these base stations. System controller 130 may be a single network entity or a collection of network entities. For a distributed architecture, base stations 110 may communicate with one another as needed.

The techniques described herein may be used for various wireless communication systems such as CDMA, TDMA, FDMA, OFDMA and SC-FDMA systems. A CDMA system utilizes code division multiplexing (CDM) and sends transmissions with different orthogonal codes. A TDMA system utilizes time division multiplexing (TDM) and sends transmissions in different time slots. An FDMA system utilizes frequency division multiplexing (FDM) and sends transmissions on different subcarriers. An OFDMA utilizes orthogonal frequency division multiplexing (OFDM), and an SC-FDMA system utilizes single-carrier frequency division multiplexing (SC-FDM). OFDM and SC-FDM partition the system bandwidth into multiple orthogonal subcarriers, which are also referred to as tones, bins, etc. Each subcarrier may be modulated with data. In general, modulation symbols are sent in the frequency domain with OFDM and in the time domain with SC-FDM. The techniques may also be used for wireless communication systems that utilize a combination of multiplexing schemes, e.g., CDMA and OFDM, or OFDM and SC-FDM, etc. For clarity, certain aspects of the techniques are described below for a system that utilizes OFDM on the forward link.

System 100 may utilize a superframe structure for transmissions sent on the forward link from the base stations to the terminals. The superframe structure may be defined in various manners and may include various fields.

Figure 2:
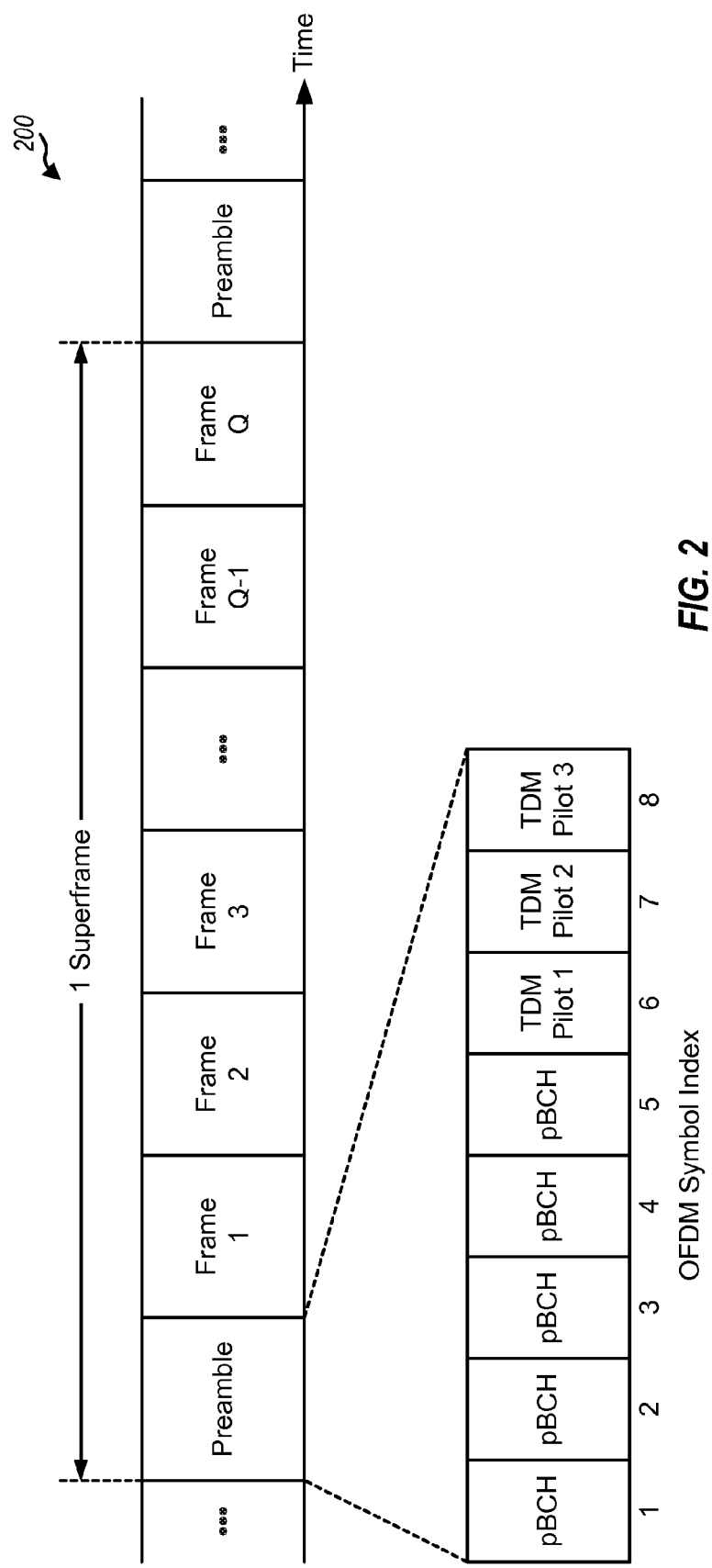
FIG. 2 shows a design of a superframe structure and a preamble structure.

FIG. 2 shows a design of a superframe structure 200 that may be used for the forward link. In this design, the transmission timeline is partitioned into units of superframes. Each superframe spans a particular time duration, which may be fixed or configurable. Each superframe includes a preamble followed by Q frames, where in general Q≥1 and in one design Q=24. The preamble carries pilots and overhead information that enable the terminals to acquire the transmitting base station, receive forward link control channels, and subsequently access the system. Each frame may carry traffic data and/or signaling and may span a predetermined time duration.

FIG. 2 also shows a design of the preamble. In this design, the preamble spans eight OFDM symbols that are assigned indices of 1 through 8. The first five OFDM symbols with indices of 1 through 5 are used for one or more primary Broadcast Channels (pBCHs). The pBCHs may carry (i) information for deployment-specific parameters such as total number of subcarriers, number of guard subcarriers, system time, etc., and (ii) sector-specific parameters such as frequency hopping structure, pilot structure, control channel structure, number of transmit antennas, etc. The last three OFDM symbols with indices of 6, 7 and 8 are used for TDM pilots 1, 2 and 3, respectively. The TDM pilots may carry sector/system information and may be used for acquisition by terminals attempting to access the system. In the design shown in FIG. 2, the TDM pilots are sent periodically in the preamble of each superframe, and each TDM pilot is sent in one OFDM symbol period.

FIG. 2 shows a specific superframe structure and a specific preamble structure for the forward link. In general, a superframe may span any time duration and may include any number of frames and other fields. A preamble may also span any time duration and include any number of fields. A preamble may include any number of TDM pilots, e.g., two, three, four, or some other number of TDM pilots. Each TDM pilot may span any number of OFDM symbol periods. For clarity, the following description assumes that three TDM pilots are sent in the preamble.

TDM pilots 1, 2 and 3 may be designed to facilitate acquisition by the terminals. A terminal may use TDM pilot 1 to detect for the presence of a preamble and to acquire coarse timing and frequency. The terminal may use TDM pilots 1, 2 and/or 3 to obtain sector/system information.

Figure 3:
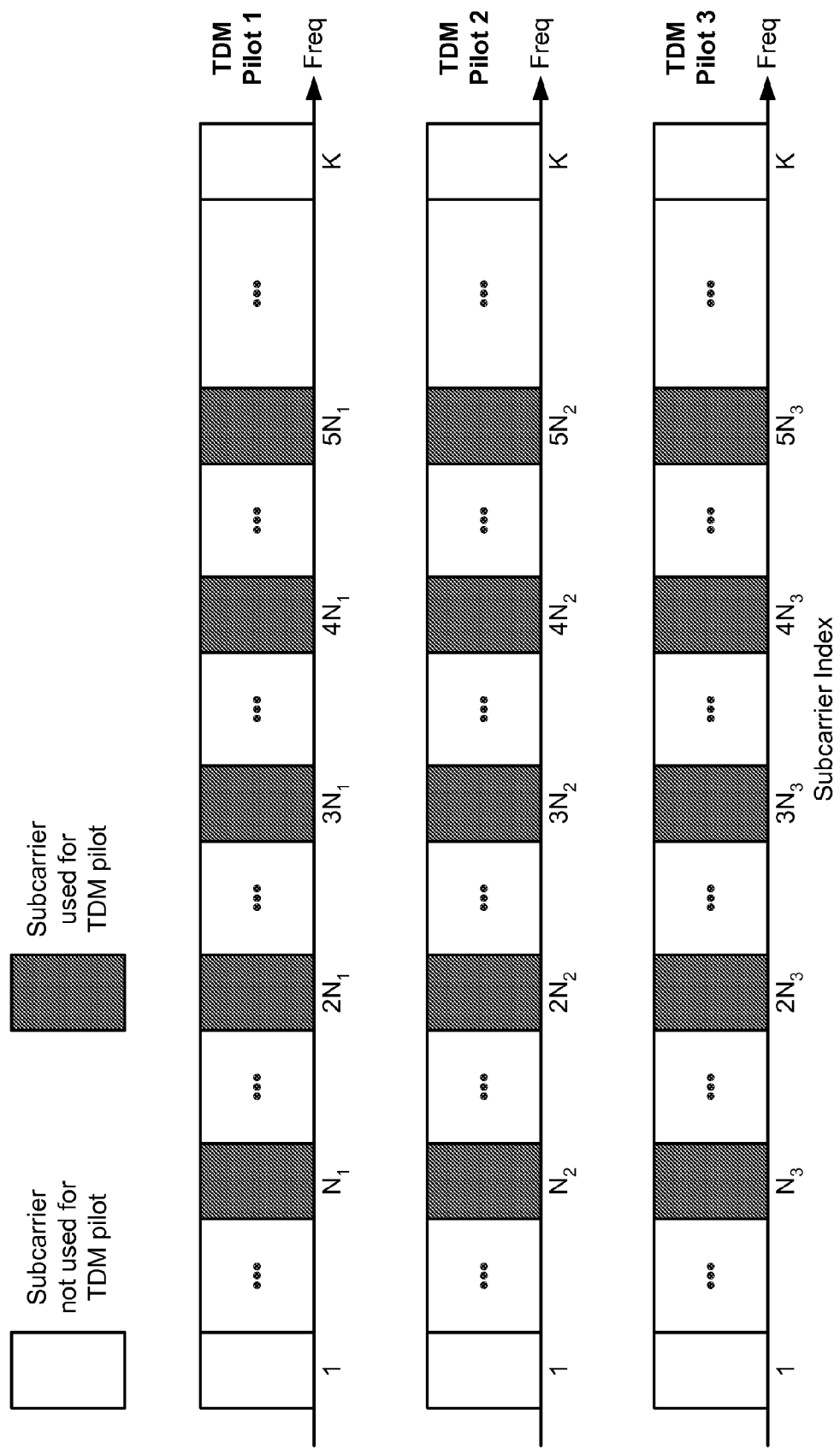
FIG. 3 shows a design of TDM pilots 1, 2 and 3 in the frequency domain.

FIG. 3 shows a design of TDM pilots 1, 2 and 3 in the frequency domain. In this design, TDM pilot 1 is sent on every $N_1$ subcarriers, TDM pilot 2 is sent on every $N_2$ subcarriers, and TDM pilot 3 is sent on every $N_3$ subcarriers, where $N_1$, $N_2$ and $N_3$ may each be any integer one or greater. As an example, $N_p$ may be equal to two for TDM pilot p, where p ∈{1, 2, 3}, and TDM pilot p may be sent on K/2 subcarriers with either even or odd indices. Zero symbols with signal values of zero may be sent on subcarriers not used for the TDM pilot. For a given TDM pilot, sending pilot symbols on every $N_p$ subcarriers in the frequency domain results in $N_p$ copies of the same TDM pilot waveform in the time domain. This waveform contains $L_p = K/N_p$ samples and may be obtained by performing an $L_p$-point fast Fourier transform (FFT) on $L_p$ pilot symbols sent on $L_p$ subcarriers used for the TDM pilot.

In general, each TDM pilot may be sent on all K subcarriers with $N_p=1$ or on a subset of the K subcarriers with $N_p>1$. The TDM pilots may be sent with the same number of subcarriers or with different numbers of subcarriers. The TDM pilots may also be sent on the same subcarriers or on different subcarriers.

Sector/system information may be sent in the TDM pilots. In general, the sector/system information may comprise any type of information such as sector-specific information, system information, etc. The sector-specific information may include a sector identifier (ID) identifying the sector sending the TDM pilots, a preferred carrier index indicating a carrier preferred by the sector and used to assist handoff for terminals, etc. The system information may include a mode flag that indicates whether the system is operating in a synchronous mode or an asynchronous mode, the cyclic prefix length, system time, etc. The sector/system information may be used to receive forward link transmissions sent by the sector and for communication with the sector. The sector/system information may include M bits, where in general M may be any integer value and in one design M=12.

In an aspect, the sector/system information is sent in the TDM pilots using a hierarchical pilot structure. For the hierarchical pilot structure, multiple sets of bits for the sector/system information may be sent in multiple TDM pilots, and the set of bits sent in a given TDM pilot may include bits sent in one or more earlier TDM pilots. The hierarchical pilot structure may reduce acquisition complexity and improve detection performance for the terminals while allowing a relatively large number of bits to be sent for the sector/system information. Several hierarchical pilot designs are described below.

Figure 4A:
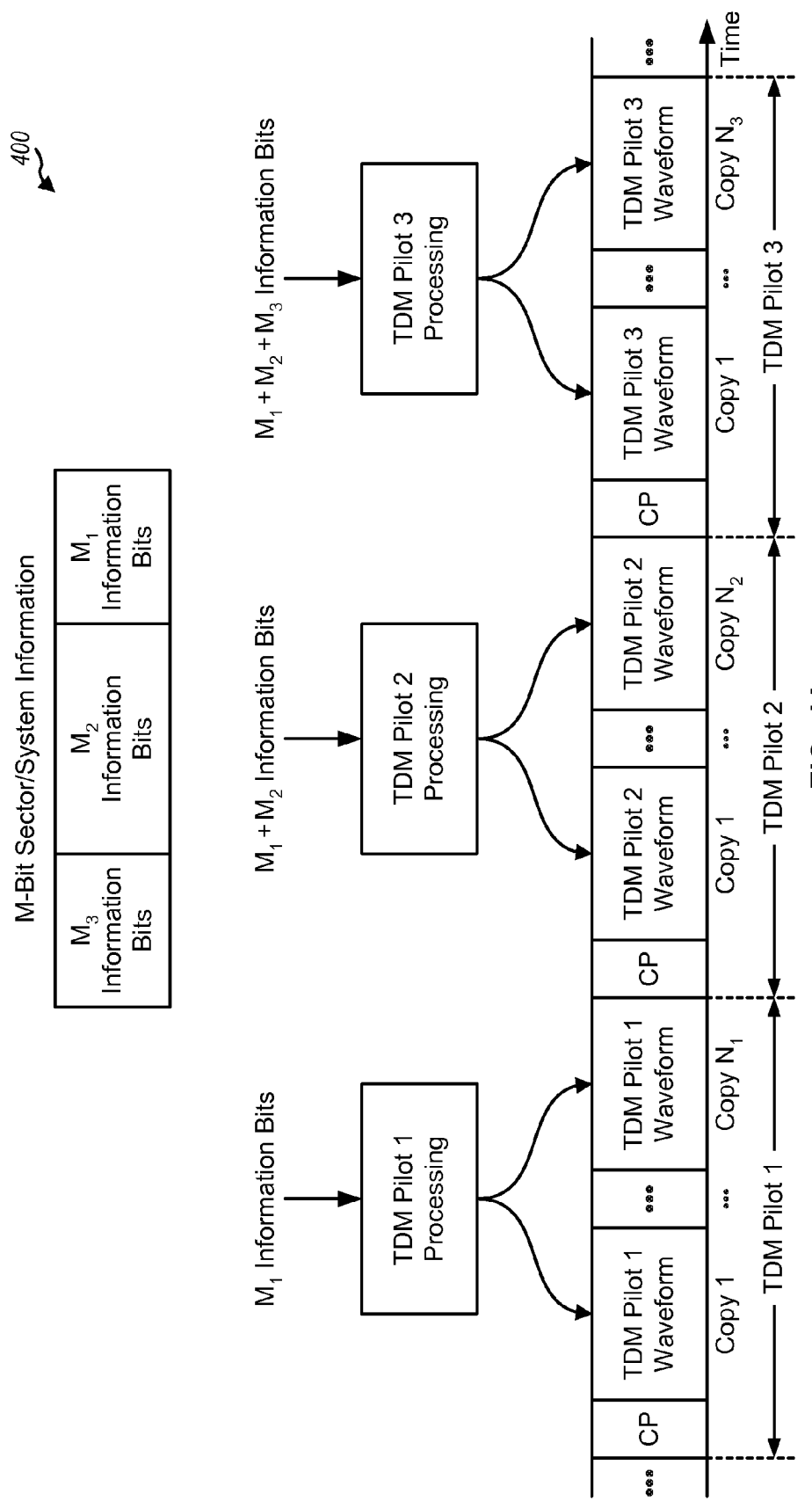
FIG. 4A shows a design of a 3-level hierarchical pilot structure.

FIG. 4A shows a design of a 3-level hierarchical pilot structure 400. In this design, the M bits of the sector/system information are partitioned into $M_1$ least significant bits (LSBs), $M_2$ more significant bits, and $M_3$ most significant bits (MSBs), where $M=M_1+M_2+M_3$. In general, $M$, $M_1$, $M_2$ and $M_3$ may each be any integer value. In one design, $M=12$, $M_1=2$, $M_2=6$, and $M_3=4$. Other values may also be used for $M$, $M_1$, $M_2$ and $M_3$.

The $M_1$ LSBs of the sector/system information may be sent in TDM pilot 1. For example, the $M_1$ LSBs may be used as a seed value for a pseudo-random number (PN) generator, and a PN sequence from the PN generator may be used to generate pilot symbols for TDM pilot 1. The $M_1+M_2$ LSBs of the sector/system information may be sent in TDM pilot 2, e.g., by seeding the PN generator with the $M_1+M_2$ LSBs and using the resultant PN sequence to generate pilot symbols for TDM pilot 2. All M bits of the sector/system information may be sent in TDM pilot 3, e.g., by seeding the PN generator with all M bits and using the resultant PN sequence to generate pilot symbols for TDM pilot 3. TDM pilots 1, 2 and 3 may thus be "scrambled" by different PN sequences generated with different portions of the sector/system information, where each portion may include some or all of the sector/system information.

TDM pilot 1 may be sent on every $N_1$ subcarriers, as shown in FIG. 3. In this case, $N_1$ copies of the same waveform may be sent for TDM pilot 1. A cyclic prefix (CP) may be appended prior to the first waveform copy. TDM pilot 2 may be sent on every $N_2$ subcarriers. In this case, $N_2$ copies of the same waveform may be sent for TDM pilot 2. TDM pilot 3 may be sent on every $N_3$ subcarriers. In this case, $N_3$ copies of the same waveform may be sent for TDM pilot 3. Each waveform may be a specific sequence of complex-valued samples.

In one design with $M=12$, TDM pilot 1 may be scrambled with $M_1=2$ bits of information and may take on four possible values, TDM pilot 2 may be scrambled with $M_1+M_2=8$ bits of information and may take on 256 possible values, and TDM pilot 3 may be scrambled with $M=12$ bits of information and may take on 4096 possible values. A terminal may process TDM pilot 1 and detect for one of four possible values for TDM pilot 1. The terminal may then process TDM pilot 2 and detect for one of 64 possible values associated with the detected value $V_1$ for TDM pilot 1. The terminal may then process TDM pilot 3 and detect for one of 16 possible values associated with the detected values $V_1$ and $V_2$ for TDM pilots 1 and 2, respectively. By performing acquisition in three stages, the terminal can detect for one of 4096 possible values for the 12-bit sector/system information by checking only 84 hypotheses, which include 4 hypotheses for TDM pilot 1, 64 hypotheses for TDM pilot 2, and 16 hypotheses for TDM pilot 3. Acquisition complexity may be greatly reduced with the hierarchical pilot structure.

Figure 4B:
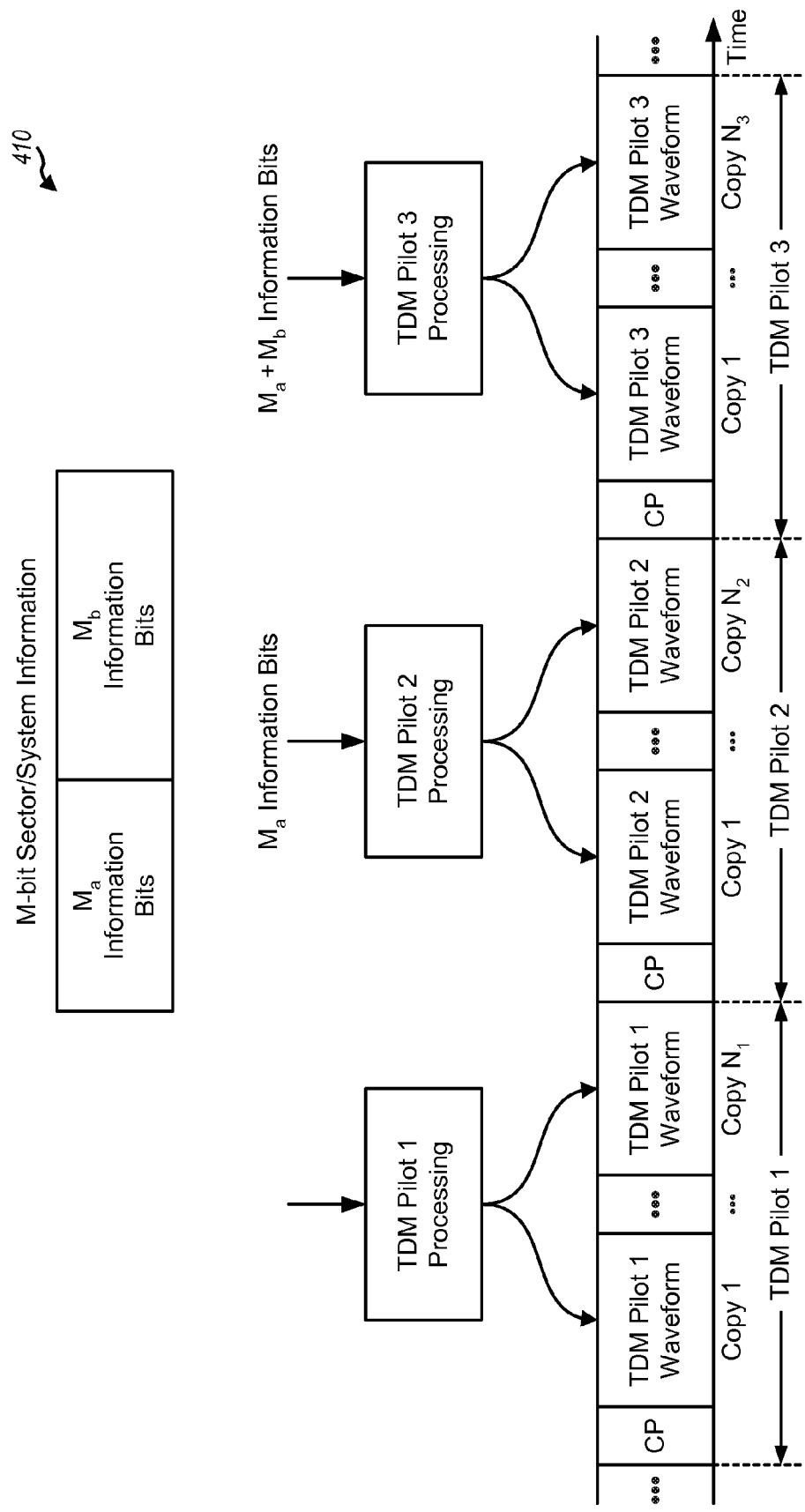
FIG. 4B shows a design of a 2-level hierarchical pilot structure.

FIG. 4B shows a design of a 2-level hierarchical pilot structure 410. In this design, the M bits of the sector/system information are partitioned into $M_a$ MSBs and $M_b$ LSBs, where $M=M_a+M_b$. In general, $M$, $M_a$ and $M_b$ may each be any integer value. TDM pilot 1 may be sent without any sector/system information and may be common for all sectors in the system. The $M_a$ MSBs of the sector/system information may be sent in TDM pilot 2, e.g., by seeding the PN generator with the $M_a$ MSBs and using the resultant PN sequence to generate pilot symbols for TDM pilot 2. All M bits of the sector/system information may be sent in TDM pilot 3, e.g., by seeding the PN generator with all M bits and using the resultant PN sequence to generate pilot symbols for TDM pilot 3.

A terminal may process TDM pilot 1 for preamble detection and coarse timing and frequency acquisition. The terminal may then process TDM pilot 2 and detect for one of $2^{M_a}$ possible values for TDM pilot 2. The terminal may then process TDM pilot 3 and detect for one of $2^{M_b}$ possible values associated with the detected value $V_a$ for TDM pilot 2. By performing acquisition in two stages, the terminal can detect for one of $2^{M_a+M_b}$ possible values for the sector/system information by checking only $2^{M_a}+2^{M_b}$ hypotheses.

In the hierarchical pilot designs shown in FIGS. 4A and 4B, each TDM pilot that is embedded with sector/system information carries (i) all information bits sent in prior TDM pilots, if any, and (ii) additional information bits not sent in prior TDM pilots. In another design, $M_1$ bits are sent in TDM pilot 1, $M_2$ bits are sent in TDM pilot 2, and all M bits are sent in TDM pilot 3. In yet another design, $M_1$ bits are sent in TDM pilot 1, $M_1$ and $M_2$ bits are sent in TDM pilot 2, and $M_2$ and $M_3$ bits are sent in TDM pilot 3. Various other hierarchical pilot designs are also possible. In general, for a hierarchical pilot, at least one bit of the sector/system information is sent in multiple TDM pilots, and at least one TDM pilot carries at least one bit sent in a prior TDM pilot.

A hierarchical pilot may improve detection performance by reducing the likelihood of false alarm. For example, in the design shown in FIG. 4A, an interfering sector may have the same $M_2$ bits as a desired sector, but may have different $M_1$ bits. In this case, the interfering sector may be eliminated because the $M_1$ and $M_2$ bits are sent in TDM pilot 2, and only the desired sector matches both $M_1$ and $M_2$ bits whereas the interfering sector matches the $M_2$ bits but does not match the $M_1$ bits.

The sector/system information may also be sent in a non-hierarchical pilot structure. For a non-hierarchical pilot structure, each bit of the sector/system information is sent in only one TDM pilot. The TDM pilots thus carry non-overlapping sets of bits for the sector/system information.

Figure 4C:
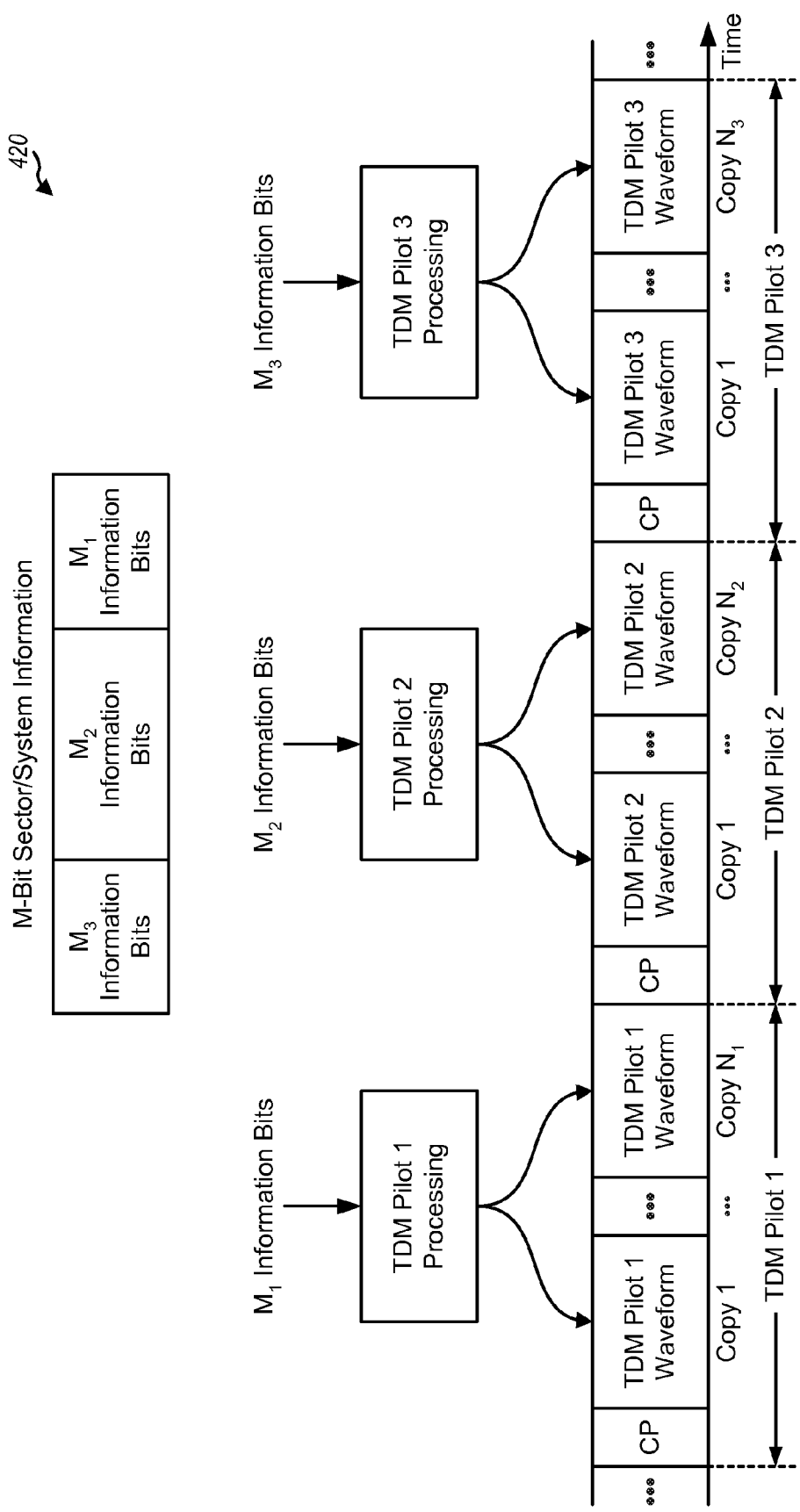
FIG. 4C shows a design of a 3-level non-hierarchical pilot structure.

FIG. 4C shows a design of a 3-level non-hierarchical pilot structure 420. In this design, the $M_1$ LSBs of the sector/system information may be sent in TDM pilot 1. The $M_2$ more significant bits of the sector/system information may be sent in TDM pilot 2. The $M_3$ MSBs of the sector/system information may be sent in TDM pilot 3.

FIGS. 4A, 4B and 4C show some example designs of hierarchical and non-hierarchical pilot structures. Various other pilot structures may also be defined. In general, a pilot structure may include any number of levels, and any set of bits for the sector/system information may be sent in each TDM pilot.

In the designs described above, some or all of the bits of the sector/system information may be used to generate a PN sequence, which may then be used to generate pilot symbols for a TDM pilot. The sector/system information may also be sent in the TDM pilots in other manners. In general, it may be desirable to send the sector/system information in a manner such that the TDM pilots for each sector appear random to other sectors. This may randomize inter-sector interference, which may improve detection performance.

Figure 5:
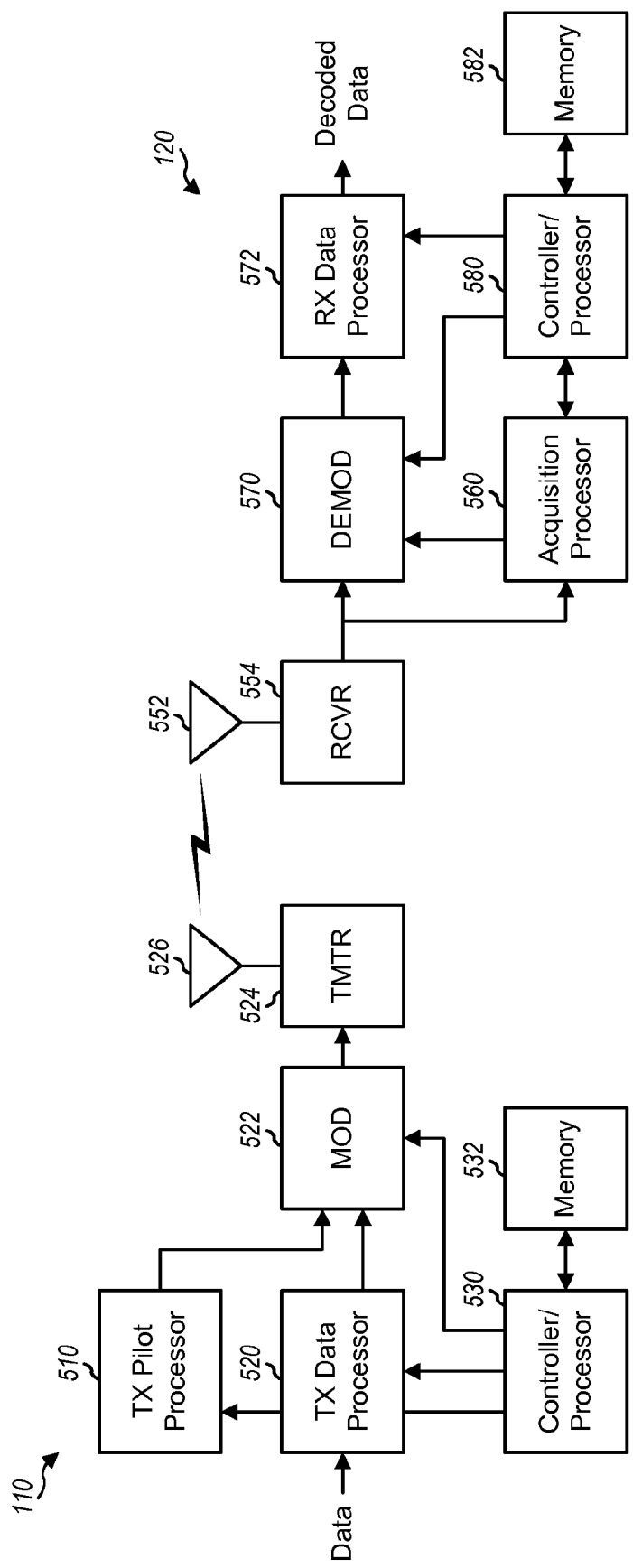
FIG. 5 shows a block diagram of a base station and a terminal.

FIG. 5 shows a block diagram of a design of a base station 110 and a terminal 120, which may be one of the base stations and terminals in FIG. 1. For simplicity, only processing units for transmissions on the forward link are shown in FIG. 5. Also for simplicity, base station 110 and terminal 120 are each equipped with a single antenna.

At base station 110, a TX pilot processor 510 generates pilot symbols for TDM pilots based on the sector/system information. As used herein, a pilot symbol is a symbol for pilot, a data symbol is a symbol for data, a zero symbol is a symbol with a signal value of zero, and a symbol is typically a complex value. The data and pilot symbols may be modulation symbols from modulation schemes such as PSK, QAM, etc. Pilot is typically data that is known a priori by both a transmitter and a receiver. However, the pilot symbols may be embedded with sector/system information that is not known a priori by a receiver. A TX data processor 520 receives traffic data and signaling data, processes the received data, and provides data symbols. A modulator (MOD) 522 performs modulation on the data and pilot symbols (e.g., for OFDM) and provides output samples. A transmitter (TMTR) 524 processes (e.g., converts to analog, amplifies, filters, and upconverts) the output samples and generates a forward link signal, which is transmitted via an antenna 526.

At terminal 120, an antenna 552 receives the forward link signal from base station 110 and provides a received signal to a receiver (RCVR) 554. Receiver 554 processes (e.g., filters, amplifies, downconverts, and digitizes) the received signal and provides received samples. An acquisition processor 560 performs acquisition based on the TDM pilots and provides timing, frequency, and sector/system information. A demodulator (DEMOD) 570 performs demodulation on the received samples (e.g., for OFDM) to obtain data symbol estimates. A receive (RX) data processor 572 processes the data symbol estimates in a manner complementary to the processing by TX data processor 520 and provides decoded data.

Controllers 530 and 580 direct the operation at base station 110 and terminal 120, respectively. Memories 532 and 582 store program codes and data for base station 110 and terminal 120, respectively.

Figure 6:
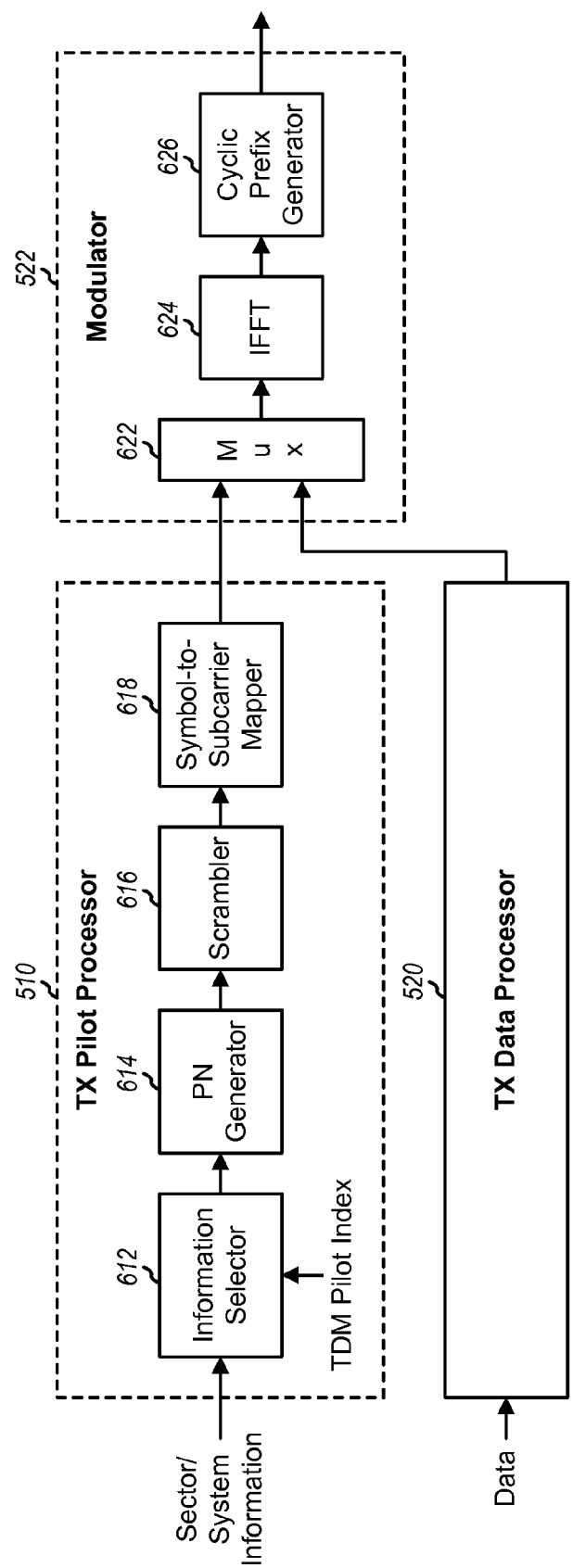
FIG. 6 shows a block diagram of a transmit (TX) pilot processor and a modulator at the base station.

FIG. 6 shows a block diagram of a design of TX pilot processor 510 and modulator 522 at base station 110 in FIG. 5. Within processor 510, a unit 612 receives the sector/system information for a sector and a TDM pilot index that indicates whether TDM pilot 1, 2 or 3 is being sent. In one design, unit 612 provides the sector/system information directly. In this design, the TDM pilots are static and do not change from superframe to superframe. In another design, unit 612 varies the sector/system information based on system time, e.g., a superframe index. In this design, the TDM pilots change from superframe to superframe, which may randomize the interference due to the TDM pilots. For this design, a terminal in a given sector y may observe randomized interference due to the TDM pilots from other sectors. This may allow the terminal to perform correlation for the TDM pilots from sector y across more than one superframe in order to detect for a weak preamble from sector y.

In any case, unit 612 provides $M_p$ bits of the sector/system information for TDM pilot p, where p $\in\{1, 2, 3\}$ and $0 \leq M_p \leq M$. In the design shown in FIG. 4A, unit 612 provides $M_1$ LSBs of the sector/system information for TDM pilot 1, $M_1+M_2$ LSBs of the sector/system information for TDM pilot 2, and all M bits of the sector/system information for TDM pilot 3. For the design shown in FIG. 4B, unit 612 provides zero bits for TDM pilot 1, $M_a$ MSBs of the sector/system information for TDM pilot 2, and all M bits of the sector/system information for TDM pilot 3. Unit 612 may provide other sets of information bits for the TDM pilots in other designs.

A PN generator 614 generates a PN sequence for TDM pilot p based on the $M_p$ information bits received from unit 612. A scrambler 616 generates pilot symbols for TDM pilot p based on the PN sequence received from PN generator 614. Scrambler 616 may form groups of B bits based on the bits in the PN sequence, map each group of B bits to a modulation symbol in a modulation scheme, and provide the modulation symbols for the groups of B bits as the pilot symbols for TDM pilot p. B may be equal to 1 for BPSK, 2 for QPSK, etc. Scrambler 616 may also scramble known modulation symbols with the PN sequence to generate the pilot symbols. A symbol-to-subcarrier mapper 618 maps the pilot symbols for TDM pilot p to the subcarriers used for TDM pilot p, maps zero symbols to the remaining subcarriers, and provides K output symbols for the K total subcarriers to modulator 522.

Within modulator 522, a multiplexer (Mux) 622 receives the output symbols from TX pilot processor 510 and TX data processor 520, provides the output symbols from processor 510 during TDM pilot intervals, and provides the output symbols from processor 520 during other intervals. In each OFDM symbol period, an IFFT unit 624 performs a K-point IFFT on K output symbols for the K total subcarriers to obtain K time-domain samples. The K samples may include multiple copies of a waveform if the pilot symbols are mapped to uniformly spaced subcarriers, e.g., as shown in FIGS. 3, 4A, 4B and 4C. A unit 626 appends a cyclic prefix to the K samples by copying the last C samples and appending these C copied samples to the front of the K samples, where C is the cyclic prefix length.

Terminal 120 may perform acquisition based on the TDM pilots in various manners. The received samples from receiver 554 may be expressed as:

$$r_i = x_i + n_i, \qquad \text{Eq (1)}$$

where $x_i$ is a sample sent by base station 110 in sample period i, $r_i$ is a sample received by terminal 120 in sample period i, and $n_i$ is the noise in sample period i.

Multiple copies of the same waveform may be sent for TDM pilot 1, e.g., as shown in FIGS. 4A and 4B. In this case, terminal 110 may perform delayed correlation to detect for TDM pilot 1, as follows:

$$C_i = \left| \sum_{j=0}^{L_1-1} r_{i-j-L_1} \cdot r_{i-j}^* \right|^2, \qquad \text{Eq (2)}$$

where $C_i$ is a delayed correlation result for sample period i, $L_1$ is the length of the waveform for TDM pilot 1, and "*" denotes a complex conjugate.

The delayed correlation in equation (2) removes the effect of the wireless channel without requiring a channel estimate and further coherently combines the received energy across the length of the waveform for TDM pilot 1. A sliding delayed correlation may be performed to obtain a delayed correlation result $C_i$ for each sample period i. $C_i$ may be compared against a threshold $C_{th}$ to detect for TDM pilot 1. For example, TDM pilot 1 may be declared if $C_i$ exceeds $C_{th}$ and remains above $C_{th}$ for a predetermined percentage of $L_1$. The sample period that results in the largest value of $C_i$ may be provided as the coarse timing, which is an indication of TDM pilot 1 position.

A coarse frequency error estimate $\Delta f$ may be derived as follows:

$$\Delta f = \frac{1}{2\pi \cdot L_1 \cdot T_{sample}} \cdot \arctan\left[ \sum_{j=0}^{L_1-1} r_{i-j-L_1} \cdot r_{i-j}^* \right], \qquad \text{Eq (3)}$$

where $T_{sample}$ is one sample period. The quantity $r_{i-j-L_1} \cdot r_{i-j}^*$ gives the phase shift from sample $r_{i-j-L_1}$ to sample $r_{i-j}$, which is $L_1$ sample periods later. The summation in equation (3) gives the average phase shift across $L_1$ sample periods. The division by $2\pi \cdot L_1 \cdot T_{sample}$ provides a per-sample frequency error estimate, in units of radians.

The frequency error estimate Δf may be used to adjust the frequency of a local oscillator (LO) signal used for frequency downconversion by receiver 554. The received samples from receiver 554 may also be rotated by Δf to remove the frequency error. The frequency error may also be removed in other manners.

After acquiring coarse timing, the first TDM pilot carrying sector/system information may be captured to obtain at least one copy of the waveform for that TDM pilot. This first TDM pilot is TDM pilot 1 for the design shown in FIG. 4A and is TDM pilot 2 for the design shown in FIG. 4B. The TDM pilot being detected is referred to as TDM pilot p in the description below, where p ∈ {1, 2, 3}. TDM pilot p contains $N_p$ copies of the same waveform, and the waveform contains $L_p$ samples. Up to $N_p$ copies of the waveform may be captured and processed to detect for the information bits sent in TDM pilot p. For example, if TDM pilot p contains two copies of the waveform, then TDM pilot p may be sampled approximately ¼ OFDM symbol period from the detected OFDM symbol boundary and for ½ OFDM symbol period to obtain K/2 captured samples for one complete copy of the waveform. For simplicity, the following description assumes that one copy of the waveform for TDM pilot p is captured and processed.

A noise estimate $\sigma^2$ may be derived based on the $L_p$ captured samples for TDM pilot p, as follows:

$$\sigma^2 = \frac{1}{L_p} \cdot \sum_{j}^{L_p} |r_j|^2, \qquad \text{Eq (4)}$$

where $r_j$ is the j-th captured sample for TDM pilot p.

$M_p$ bits of sector/system information may be sent in TDM pilot p. To determine the value of the $M_p$ bits sent in TDM pilot p, a decision metric may be computed for each of the possible values that might have been sent in TDM pilot p. The value with the best decision metric may be declared as the value sent in TDM pilot p. The detection of the transmitted value may be performed in various manners.

In one design, the $L_p$ captured samples may be transformed to the frequency domain with an FFT to obtain $L_p$ received symbols. For each hypothesis corresponding to a different value m hypothesized to have been sent in TDM pilot p, where $0 \le m < 2^{M_p}$ for the first TDM pilot being detected, a PN sequence may be generated for hypothesized value m. The $L_p$ received symbols may be descrambled with the PN sequence, and the $L_p$ descrambled symbols may be transformed back to the time domain with an IFFT to obtain $L_p$ descrambled samples. A detection metric $E_m$ may be computed for hypothesized value m, as follows:

$$E_m = \sum_{j}^{L_p} ||c_{j,m}|^2 - \eta \cdot \sigma^2|, \text{ or} \qquad \text{Eq (5)}$$

$$E_m = \sum_{\{j, |c_{j,m}|^2 > \eta \sigma^2\}}^{L_p} |c_{j,m}|^2,$$

where $c_{j,m}$ is the j-th descrambled sample for hypothesized value m, and
η is a predetermined factor.

A detection metric may be computed for each of the $2^{M_p}$ possible values that might have been sent in TDM pilot p. The $2^{M_p}$ detection metrics may be denoted as $E_m$, for m=0, 1, ..., $2^{M_p}-1$. The hypothesized value with the largest detection metric may be declared as a detected value $V_p$, which is the value deemed to have been sent for the $M_p$ bits carried in TDM pilot p.

The detection described above may be repeated for each subsequent TDM pilot carrying some or all of the sector/system information. For each TDM pilot, the detected values from all previously detected TDM pilots may be used to form all possible values for the bits sent in that TDM pilot.

For the design shown in FIG. 4A, the detected value $V_1$ for the $M_1$ information bits sent in TDM pilot 1 may be used to form $2^{M_2}$ possible ($M_1+M_2$)-bit values that might have been sent in TDM pilot 2. Each possible value for TDM pilot 2 is composed of the detected value $V_1$ for TDM pilot 1 and a hypothesized value m for the $M_2$ new bits sent in TDM pilot 2, where $0 \le m < 2^{M_2}$. Similarly, the detected value $V_1$ for the $M_1$ information bits sent in TDM pilot 1 and the detected value $V_2$ for the $M_2$ information bits sent in TDM pilot 2 may be used to form $2^{M_3}$ possible M-bit values that might have been sent in TDM pilot 3. Each possible value for TDM pilot 3 is composed of the detected value $V_1$ for TDM pilot 1, the detected value $V_2$ for TDM pilot 2, and a hypothesized value m for the $M_3$ new bits sent in TDM pilot 3, where $0 \le m < 2^{M_3}$.

For the design shown in FIG. 4B, the detected value $V_a$ for the $M_a$ information bits sent in TDM pilot 2 may be used to form $2^{M_b}$ possible M-bit values that might have been sent in TDM pilot 3. Each possible value for TDM pilot 3 is composed of the detected value $V_a$ for TDM pilot 2 and a hypothesized value m for the $M_b$ new bits sent in TDM pilot 3, where $0 \le m < 2^{M_b}$.

For each TDM pilot p, detection metrics may be computed for all possible values for TDM pilot p, e.g., as shown in equations (4) and (5). The hypothesized value with the largest detection metric may be declared as the detected value for TDM pilot p.

Figure 7:
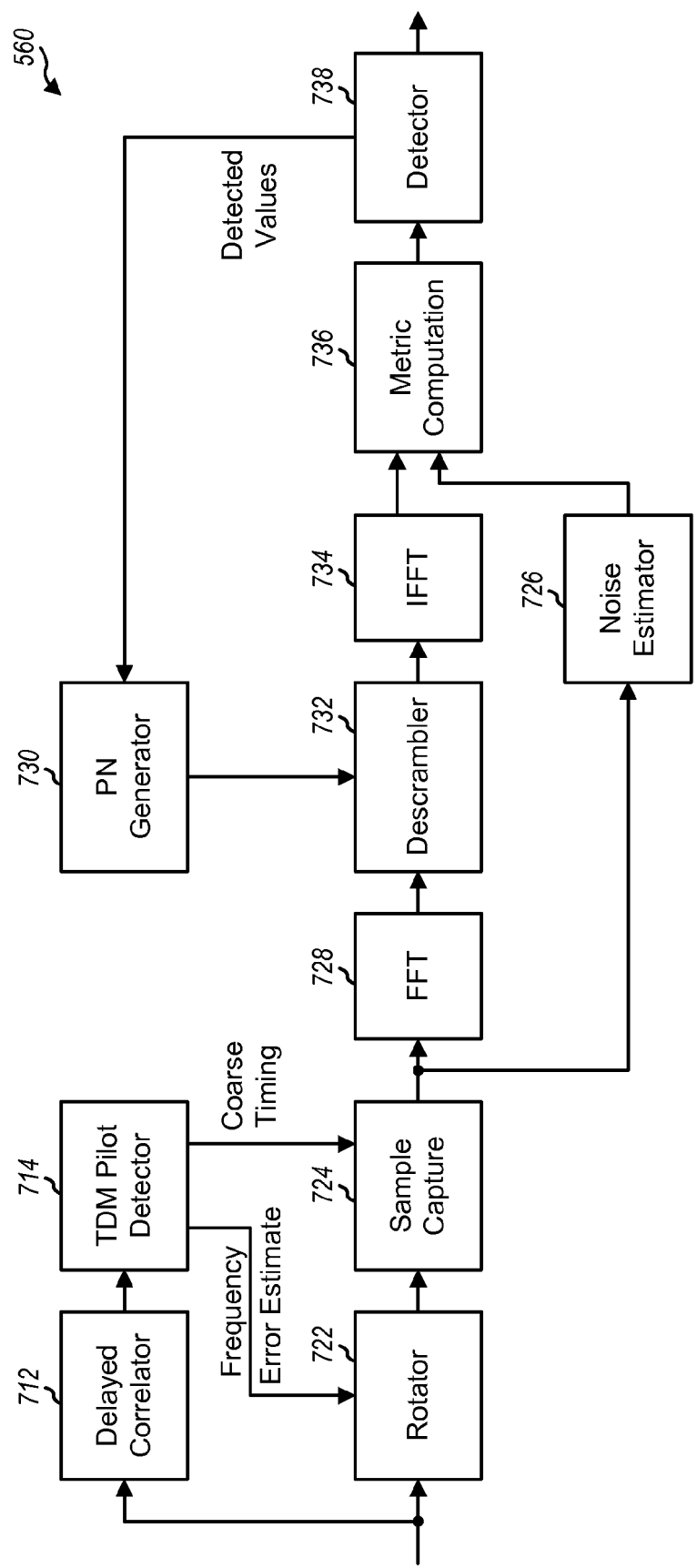
FIG. 7 shows a block diagram of an acquisition processor at the terminal.

FIG. 7 shows a block diagram of a design of acquisition processor 560 at terminal 120 in FIG. 5. Within processor 560, a delayed correlator 712 obtains the received samples from receiver 554 and performs sliding delayed correlation, e.g., as shown in equation (2). A TDM pilot detector 714 receives the correlation results $C_i$ from delayed correlator 712 and detects for TDM pilot 1. After detecting TDM pilot 1, detector 714 determines coarse timing and frequency error estimate Δf based on the received samples that result in the detection of TDM pilot 1.

A rotator 722 rotates the received samples based on the frequency error estimate Δf and provides rotated samples having the frequency error removed. For each TDM pilot carrying sector/system information, a unit 724 may capture samples for one or more copies of the waveform for that TDM pilot, based on the coarse timing from detector 714. A unit 726 derives a noise estimate for the captured samples, e.g., as shown in equation (4). An FFT unit 728 performs an FFT on the captured samples and provides received symbols. A PN generator 730 generates a PN sequence for each possible value that might have been sent in the TDM pilot being detected. The PN sequences for the TDM pilot currently being detected may be dependent on the detected values for previously detected TDM pilots, if any. For each hypothesized value m, a descrambler 732 descrambles the received symbols with the corresponding PN sequence and provides descrambled symbols. Descrambler 732 essentially removes the modulation on the received symbols with the PN sequence. The descrambled symbols contain mostly noise if the locally generated PN sequence is not the PN sequence sent in the TDM pilot being detected. An IFFT unit 734 performs an IFFT on the descrambled symbols and provides descrambled samples $c_{j,m}$.

A unit 736 computes the detection metric $E_m$ for each hypothesized value m based on the descrambled samples and the noise estimate, e.g., as shown in equation (5). A detector 738 receives the detection metrics $E_m$ for all possible values that might have been sent in the TDM pilot being detected. Detector 738 identifies the hypothesized value with the largest detection metric and provides this value as the detected value $V_p$ for the TDM pilot being detected. PN generator 730 may receive the detected value $V_p$ from detector 738 and use this value to generate PN sequences for the next TDM pilot to be detected. After all TDM pilots are detected, detector 738 provides the final detected value as the recovered sector/system information.

FIG. 7 shows one design for performing detection for the TDM pilots. In another design, the captured samples for a given TDM pilot are correlated with each possible waveform that might have been sent for that TDM pilot. Different possible waveforms may be generated based on different hypothesized values for the TDM pilot. The hypothesized value with the largest correlation result may be provided as the detected value for the TDM pilot. The detection for the TDM pilots may also be performed in other manners.

After detecting all TDM pilots, one or more TDM pilots may be used to derive fine timing and/or a fine frequency error estimate. OFDM symbols may be received and processed based on the fine timing and/or fine frequency error estimate.

FIG. 8 shows a design of a process 800 performed by a base station to send TDM pilots. A plurality of pilots may be generated based on different sets of bits for information being sent in the plurality of pilots, with each set including some or all bits of the information being sent (block 812). The information being sent may comprise sector-specific information, system information, etc. The plurality of pilots may be sent in sequential order in a plurality of time intervals (block 814).

For a hierarchical pilot structure, the plurality of pilots may carry overlapping sets of bits, e.g., as shown in FIGS. 4A and 4B. The set of bits sent in each pilot may comprise bits sent in pilots transmitted earlier, if any, and additional bits not yet sent. For a 2-level hierarchical pilot structure, a first pilot may be generated based on some of the bits for the information, and a second pilot may be generated based on all of the bits for the information. For a 3-level hierarchical pilot structure, a first pilot may be generated based on a first set of bits, a second pilot may be generated based on a second set of bits, which may comprise the first set, and a third pilot may be generated based on all of the bits for the information. For a non-hierarchical pilot structure, the plurality of pilots may carry non-overlapping sets of bits for the information, e.g., as shown in FIG. 4C.

For each pilot, a PN sequence may be generated based on the set of bits being sent in the pilot. Pilot symbols may be generated based on the PN sequence and mapped to subcarriers used for the pilot. The mapped pilot symbols may be transformed to obtain a sequence of samples for the pilot. A given pilot may comprise one or multiple copies of a waveform.

FIG. 9 shows a design of an apparatus 900 for sending TDM pilots. Apparatus 900 includes means for generating a plurality of pilots based on different sets of bits for information being sent in the plurality of pilots, with each set including some or all bits of the information being sent (module 912), and means for sending the plurality of pilots in sequential order in a plurality of time intervals (module 914).

FIG. 10 shows a design of a process 1000 performed by a terminal to receive TDM pilots. A plurality of pilots may be received in a plurality of time intervals (block 1012). The plurality of pilots may carry different sets of bits for information sent in the pilots, with each set including some or all bits of the information. Detection may be performed to recover a set of bits sent in each of the plurality of pilots (block 1014).

For a hierarchical pilot structure, detection for each pilot may be performed based on detected values for pilots previously detected, if any, to obtain a detected value for the set of bits sent in the pilot being detected. For a 2-level hierarchical pilot structure, detection for a first pilot may be performed to obtain a first detected value for a first set of bits sent in the first pilot. Detection for a second pilot may be performed based on the first detected value to obtain a second detected value for all bits of the information. For a 3-level hierarchical pilot structure, detection for a first pilot may be performed to obtain a first detected value for a first set of bits sent in the first pilot. Detection for a second pilot may be performed based on the first detected value to obtain a second detected value for a second set of bits sent in the second pilot, where the second set may comprise the first set. Detection for a third pilot may be performed based on the first and second detected values to obtain a third detected value for all bits of information. For a non-hierarchical pilot structure, detection may be performed independently for each pilot to obtain a detected value for the set of bits sent in that pilot.

For each pilot, a detection metric may be determined for each of a plurality of hypothesized values for that pilot. The hypothesized value associated with a largest detection metric may be provided as a detected value for the set of bits sent in the pilot. Each hypothesized value for the pilot being detected may comprise (i) a first part for the detected values for pilots previously detected, if any, and (ii) a second part for an unknown value for additional bits sent in the pilot being detected.

In one design, a noise estimate may be derived based on captured samples for the pilot being detected. A plurality of PN sequences may be generated for a plurality of hypothesized values for the pilot. The captured samples may be descrambled based on the plurality of PN sequences (e.g., in the time domain or the frequency domain) to obtain a plurality of sequences of descrambled samples. For frequency-domain descrambling, the captured samples may be transformed to the frequency domain to obtain received symbols. Modulation in the received symbols may be removed based on the PN sequence for each hypothesized value to obtain descrambled symbols for that hypothesized value. The descrambled symbols for each hypothesized value may be transformed back to the time domain to obtain a sequence of descrambled samples for that hypothesized value. A plurality of detection metrics may be derived for the plurality of hypothesized values based on the plurality of sequences of descrambled samples and the noise estimate. For example, the energy of each descrambled sample may be computed. The detection metric for each hypothesized value may then be computed based on the energies for the sequence of descrambled samples and the noise estimate, e.g., as shown in equation (5).

FIG. 11 shows a design of an apparatus 1100 for receiving TDM pilots. Apparatus 1100 includes means for receiving a plurality of pilots in a plurality of time intervals, with the plurality of pilots carrying different sets of bits for information sent in the pilots, and with each set including some or all bits of the information (module 1112), and means for performing detection to recover a set of bits sent in each of the plurality of pilots (module 1114).

Modules 912 and 914 in FIG. 9 and modules 1112 and 1114 in FIG. 11 may comprise processors, electronics devices, hardware devices, electronics components, logical circuits, memories, etc., or any combination thereof.

The techniques described herein may be implemented by various means. For example, the techniques may be implemented in hardware, firmware, software, or a combination thereof. For a hardware implementation, the processing units at a given entity (e.g., a base station or a terminal) a may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 532 or 582 in FIG. 5) and executed by a processor (e.g., processor 530 or 580). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
    at least one processor configured to:
        generate a first pilot sequence based on a first set of bits of information to send,
        generate a second pilot sequence based on a second set of bits of the information, the second set of bits being different from the first set of bits, the second pilot sequence being different from the first pilot sequence,
        generate a third pilot sequence based on all bits of the information, the third pilot sequence being different from the first pilot sequence and also different from the second pilot sequence,
        generate a first pilot based on the first pilot sequence,
        generate a second pilot based on the second pilot sequence,
        generate a third pilot based on the third pilot sequence, and
        send the first, second, and third pilots in first, second, and third time intervals, respectively,
        wherein the first and second pilot sequences are generated based on non-overlapping sets of bits of the information.

2. The apparatus of claim 1, wherein the first set includes M1 bits of the information, and wherein the second set includes the M1 bits in the first set and M2 additional bits of the information, where M1 and M2 are integer values.

3. The apparatus of claim 1, wherein the second set comprises all bits of the information.

4. The apparatus of claim 1, wherein the information comprises 12 bits, the first set comprises 2 bits, and the second set comprises 8 bits and includes the 2 bits in the first set.

5. The apparatus of claim 1, wherein the at least one processor is configured to generate a pseudo-random number (PN) sequence for each pilot based on the set of bits of the information to send in the pilot, and to generate each pilot based on the PN sequence for the pilot, and wherein the pilot sequence for each pilot comprises the PN sequence for the pilot.

6. The apparatus of claim 1, wherein for each pilot, the at least one processor is configured to generate a pseudo-random number (PN) sequence based on the set of bits to send in the pilot, to generate pilot symbols based on the PN sequence, to map the pilot symbols to subcarriers used for the pilot, and to transform the mapped pilot symbols to obtain a sequence of samples for the pilot.

7. The apparatus of claim 1, wherein the first pilot is adjacent to the second pilot in time.

8. The apparatus of claim 1, wherein the first, second and third pilots are time division multiplexed (TDM).

9. The apparatus of claim 1, wherein the information to send comprises sector-specific information, or system information, or both.

10. The apparatus of claim 1, wherein the information to send in the first, second, and third pilots comprises a sector identifier (ID).

11. The apparatus of claim 1, wherein the first set of bits and the second set of bits comprise a sector identifier (ID).

12. The apparatus of claim 1, wherein the third pilot is sent on subcarriers evenly spaced across system bandwidth.

13. The apparatus of claim 1, wherein the first, second, and third pilots are sent in different symbol periods of a frame of a predetermined time duration.

14. A method comprising:
    generating a first pilot sequence based on a first set of bits of information to send;
    generating a second pilot sequence based on a second set of bits of the information, the second set of bits being different from the first set of bits, the second pilot sequence being different from the first pilot sequence;
    generating a third pilot sequence based on all bits of the information, the third pilot sequence being different from the first pilot sequence and also different from the second pilot sequence;
    generating a first pilot based on the first pilot sequence;
    generating a second pilot based on the second pilot sequence;
    generating a third pilot based on the third pilot sequence; and
    sending the first, second, and third pilots in first, second, and third time intervals, respectively,
    wherein the first and second pilot sequences are generated based on non-overlapping sets of bits of the information.

15. The method of claim 14, further comprising:
    generating a pseudo-random number (PN) sequence for each pilot based on the set of bits of the information to send in the pilot, wherein the pilot sequence for each pilot comprises the PN sequence for the pilot, and
    generating each pilot based on the PN sequence for the pilot.

16. The method of claim 14, wherein the information to send in the first, second, and third pilots comprises a sector identifier (ID).

17. The method of claim 14, wherein the first set of bits and the second set of bits comprise a sector identifier (ID).

18. The method of claim 16, wherein the third pilot is sent on subcarriers evenly spaced across system bandwidth.

19. The method of claim 16, wherein the first, second, and third pilots are sent in different symbol periods of a frame of a predetermined time duration.

20. An apparatus comprising:
  means for generating a first pilot sequence based on a first set of bits of information to send;
  means for generating a second pilot sequence based on a second set of bits of the information, the second set of bits being different from the first set of bits, the second pilot sequence being different from the first pilot sequence;
  means for generating a third pilot sequence based on all bits of the information, the third pilot sequence being different from the first pilot sequence and also different from the second pilot sequence;
  means for generating a first pilot based on the first pilot sequence;
  means for generating a second pilot based on the second pilot sequence;
  wherein the first and second pilot sequences are generated based on non-overlapping sets of bits of the information;
  means for generating a third pilot based on the third pilot sequence; and
  means for sending the first, second, and third pilots in first, second, and third time intervals, respectively.

21. The apparatus of claim 20, further comprising:
  means for generating a pseudo-random number (PN) sequence for each pilot based on the set of bits of the information to send in the pilot, wherein the pilot sequence for each pilot comprises the PN sequence for the pilot, and
  means for generating each pilot based on the PN sequence for the pilot.

22. A non-transitory processor-readable medium including instructions stored thereon, comprising:
  instructions for generating a first pilot sequence based on a first set of bits of information to send;
  instructions for generating a second pilot sequence based on a second set of bits of the information, the second set of bits being different from the first set of bits, the second pilot sequence being different from the first pilot sequence;
  instructions for generating a third pilot sequence based on all bits of the information, the third pilot sequence being different from the first pilot sequence and also different from the second pilot sequence;
  instructions for generating a first pilot based on the first pilot sequence;
  instructions for generating a second pilot based on the second pilot sequence;
  wherein the first and second pilot sequences are generated based on non-overlapping sets of bits of the information;
  instructions for generating a third pilot based on the third pilot sequence; and
  instructions for sending the first, second, and third pilots in first, second, and third time intervals, respectively.

* * * * *